(No Model.) 2 Sheets—Sheet 1.
J. STOCK.
PHOTOGRAPHIC PLATE HOLDER.
No. 543,585. Patented July 30, 1895.
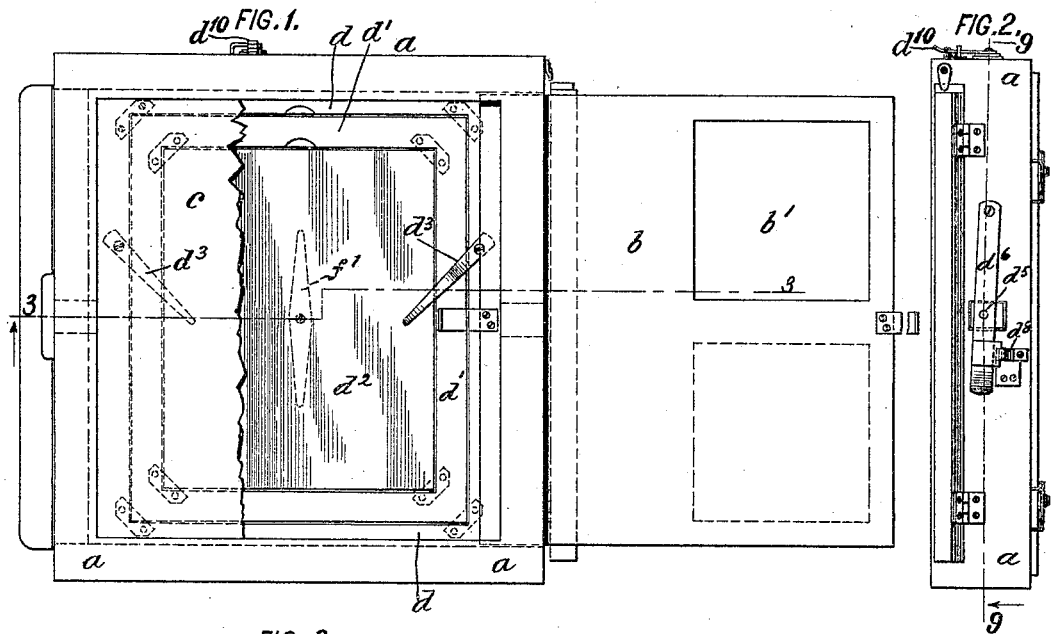
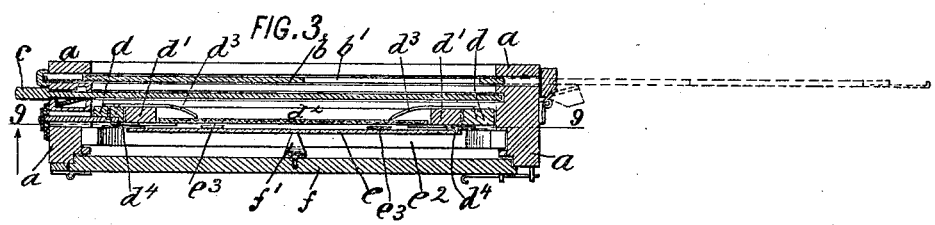
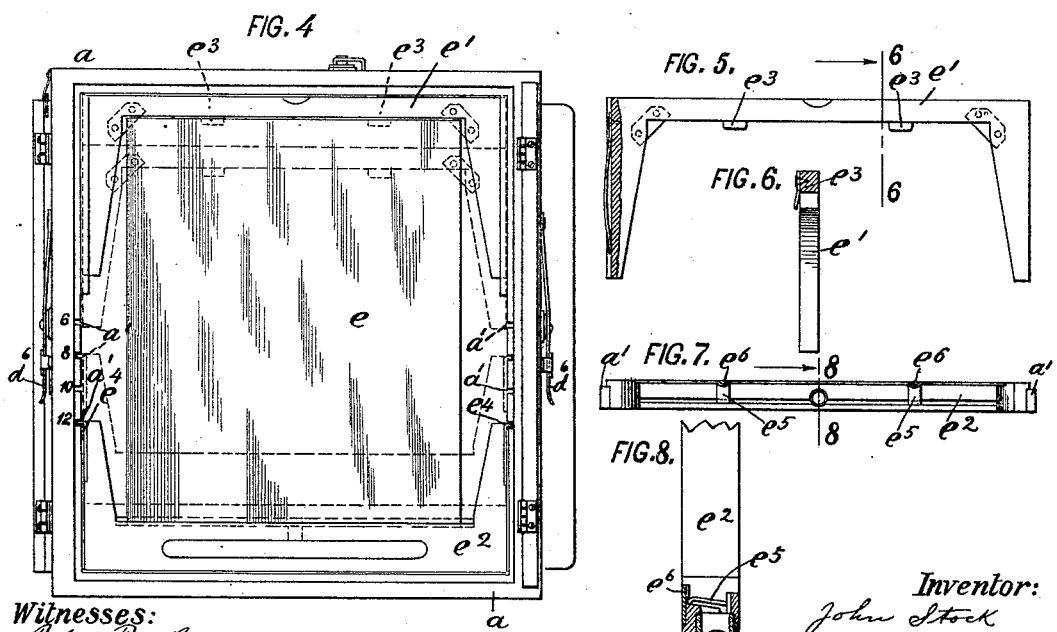
Witnesses:
John Becker
Theodore Becker
Inventor:
John Stock
by his attorneys
Roeder & Briesen

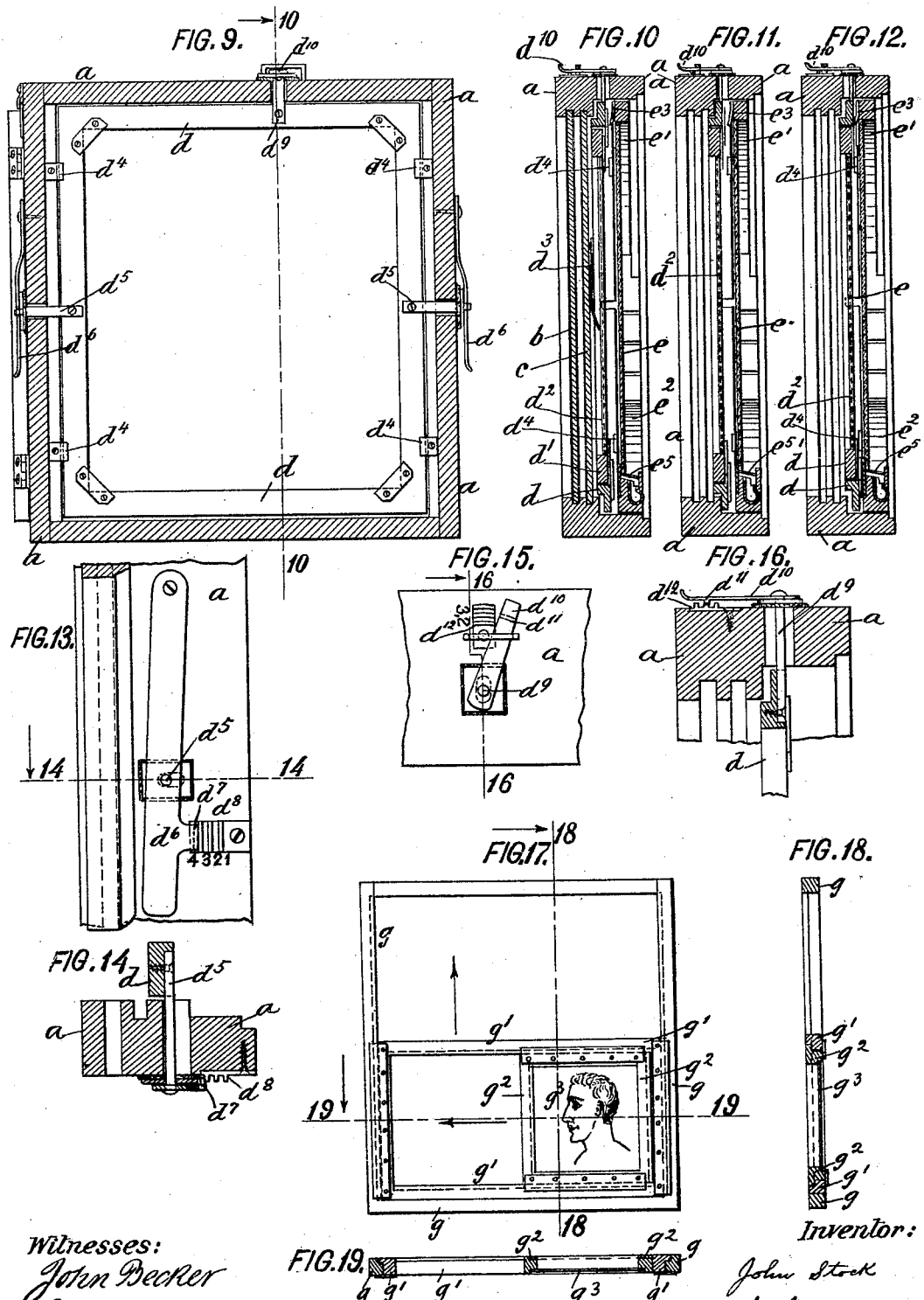

UNITED STATES PATENT OFFICE.

JOHN STOCK, OF NEW YORK, N. Y.

PHOTOGRAPHIC-PLATE HOLDER.

SPECIFICATION forming part of Letters Patent No. 543,585, dated July 30, 1895.

Application filed April 30, 1895. Serial No. 547,604. (No model.)

*To all whom it may concern:*

Be it known that I, JOHN STOCK, a citizen of the United States, and a resident of New York, in the county of New York and State of New York, have invented certain new and useful Improvements in Photographic-Plate Holders, of which the following is a specification.

This invention relates to various improvements in photographic-plate holders, and more particularly to a novel construction of the screen-frame, shutters, and the slide for holding the sensitized plate.

In the accompanying drawings, Figure 1 is a face view of my improved plate-holder with the front shutter drawn out and the rear shutter partly broken away; Fig. 2, an end view of Fig. 1; Fig. 3, a horizontal section on line 3 3, Fig. 1; Fig. 4, a rear view of the plate-holder with the door removed; Fig. 5, a side view of the upper slide for holding the sensitized plate; Fig. 6, a section on line 6 6, Fig. 5; Fig. 7, a top view of the lower slide; Fig. 8, an enlarged section on line 8 8, Fig. 7; Fig. 9, a section on line 9 9, Fig. 2. Figs. 10, 11, and 12 are cross-sections on line 10 10, Fig. 9, showing the screen in different positions; Fig. 13, an enlarged detail of the side-locking mechanism of the screen; Fig. 14, a cross-section on line 14 14, Fig. 13; Fig. 15, a plan of the top-locking mechanism of the screen; Fig. 16, a section on line 16 16, Fig. 15; Fig. 17, a side view of the copy-frame; Fig. 18, a section on line 18 18, Fig. 17; and Fig. 19, a section on line 19 19, Fig. 18.

The letter $a$ represents the frame of the plate-holder adapted for the reception of a front shutter $b$, a rear shutter $c$, a screen-frame $d$, and a sensitized plate $e$, placed back of one another. The plate $e$ is held in place by an upper slide $e'$ and a lower slide $e^2$, Figs. 4 to 8, vertically movable within a groove of the frame $a$. The upper slide is provided with the lugs $e^3$, against which the plate $e$ is pressed by a spring $f'$, secured to the rear door $f$ of the plate-holder. The lower slide $e^2$ is provided with lugs $e^4$, adapted to engage grooves $a'$ of frame $a$, Fig. 4, so as to hold the slide at different vertical positions. This lower slide is, moreover, provided with a perforated trough or silver salver to catch the drippings, and with a pair of bridges $e^5$ upon which the sensitized plate rests. Inwardly-turned nicks $e^6$ on the front wall of the trough hold the sensitized plate at a distance from such wall and prevent moisture from creeping up the plate by capillary action.

The frame $d$ is of a size to encircle the frame $d'$, containing the screen $d^2$. The frame $d'$ is held to the frame $d$ by means of springs $d^3$, secured to frame $d$ and pressing the frame $d'$ against lugs $d^4$ of frame $d$. I have made the frame $d$ adjustable in the plate-holder, so that the distance between screen $d^2$ and sensitized plate $e$ may be readily varied by mechanism secured to the outside of the plate-holder. In Figs. 11 and 12 the extreme positions and in Fig. 10 one of the intermediate positions of the screen are shown. The object of this adjustment is, of course, to harden or soften the lines of the picture. In order to effect this adjustment of the frame $d$, it is provided at the center of its upright sides with laterally-extending arms $d^5$ that pass outwardly through slots in the side of the plate-holder $a$, Fig. 9. These arms are connected to spring catches or levers $d^6$, Fig. 2, pivoted to the plate-holder and having teeth $d^7$ adapted to engage fixed racks $d^8$. It will be seen that by vibrating the levers $d^6$ and causing them to interlock with either of the teeth of the racks $d^8$ the frame $d$ may be readily set and locked at the desired distance from the sensitized plate $e$. In order to also lock the frame $d$ at the top of the plate-holder between its extreme portions, Fig. 10, and prevent it from tilting, it is provided at the center of its upper side with an arm $d^9$, Figs. 15 and 16, connected to lever $d^{10}$, having tooth $d^{11}$ and adapted to engage the rack $d^{12}$. To set the frame $d$ the side levers $d^6$ are first manipulated, and after the frame has been properly set by them it is righted and locked in position at the top by the lever $d^{10}$.

To facilitate the setting of the frame $d$ the racks $d^8$ $d^{12}$ are provided with index-numbers, Figs. 13 and 15.

The inner slide or shutter $c$ is continuous or unbroken, and when in its closed position excludes the light completely from the sensitized plate. The outer shutter $b$, however, has a square opening $b'$, Fig. 1, formed in one of its corners. By withdrawing and reversing the shutter $b$ this opening may be brought in line with either one of the four corners of the sensitized plate, and thus light may be admitted consecutively to the four corners of such plate. By the use of the two shutters four (more or less) exposures can be made upon the same plate without removing the plate, however, from the camera.

In use, the inner shutter is closed, the outer shutter is set, and then the inner shutter is opened to effect the exposure. After the first exposure the inner shutter is closed, the outer shutter is reversed to bring the opening $b'$ into a new position, and then the second exposure is made. In this way the four exposures are made in rapid succession and then the plate-holder is removed and conveyed to the dark-room where all four objects are developed at the same time, thus finishing four pictures in the time and with the same amount of material as is ordinarily used on a single negative.

If the object to be copied or reduced is a picture, photograph, artist's drawing, &c., it is mounted upon the copy-frame illustrated in Figs. 17 to 19. This frame $g$ is provided with an intermediate sliding frame $g'$, made of one-half the size of the main frame $g$. Within the intermediate frame $g'$ slides a third or inner frame $g^2$, made of one-half the size of the frame $g'$ and adapted to hold the picture $g^3$. By moving the frame $g'$ up or down and moving the frame $g^2$ to the right or left, the picture $g^3$ can be placed into any one of the four corners of the frame $g$. In this way the picture can be set in harmony with the slide $b$, so as to be in line with the opening $b'$ of such slide.

What I claim is—

1. A photographic plate holder provided with an outer shutter having an opening, an inner imperforate shutter, an adjustable screen and a pair of slides for holding the sensitized plate, substantially as specified.

2. A photographic plate holder provided with a movable screen-holding frame, outwardly extending arms secured to such frame and a locking device at the outside of the plate holder which is connected to such arms and is adapted to lock the frame in different positions, substantially as specified.

3. A photographic plate holder provided with a movable screen-holding frame, outwardly extending arms secured to such frame, levers pivoted to the plate holder and connected to the arms and racks engaged by the levers, substantially as specified.

Signed at New York, in the county of New York and State of New York, this 27th day of April, A. D. 1895.

JOHN STOCK.

Witnesses:
F. v. BRIESEN,
WILLIAM SCHULZ.